United States Patent [19]

Shepherd

[11] 3,846,769

[45] Nov. 5, 1974

[54] MAGNETIC DATA STORAGE ARRANGEMENT HAVING SEQUENTIAL ADDRESSING OF ROWS

[75] Inventor: Graham Shepherd, Maidstone, England

[73] Assignee: Elliott Brothers (London) Limited, New Street, Chelmsford, England

[22] Filed: Jan. 12, 1973

[21] Appl. No.: 323,090

[30] Foreign Application Priority Data

Jan. 14, 1972 Great Britain ..................... 1968/72

[52] U.S. Cl.. 340/174 M, 340/174 VB, 340/174 TB

[51] Int. Cl. .......................... G11c 7/00, G11c 11/06

[58] Field of Search.... 340/174 VB, 174 TB, 174 M

[56] References Cited

UNITED STATES PATENTS

| | | | |
|---|---|---|---|
| 3,015,809 | 1/1962 | Myers | 340/174 M |
| 3,115,619 | 12/1963 | Barrett et al. | 340/174 M |
| 3,339,081 | 8/1967 | Borden et al. | 307/86 |
| 3,344,282 | 9/1967 | Baude | 307/87 |
| 3,414,890 | 12/1968 | Schwartz | 340/174 M |
| 3,706,078 | 12/1972 | Hilberg | 340/174 VB |

OTHER PUBLICATIONS

IBM Tech. Disc. Bulletin, "Memory Drive System" by Caricari et al.; Vol. 9, No. 7; 12/66 pgs.-928, 929.

*Primary Examiner*—Stanley M. Urynowicz, Jr.
*Attorney, Agent, or Firm*—Kirschstein, Kirschstein, Ottinger & Frank

[57] ABSTRACT

A magnetic data storage arrangement of the kind including a plurality of current operated bistable magnetic elements arranged in rows and columns such that a data word may be stored in a selected column by the application of a first predetermined current to the selected column and a second predetermined current to the appropriate rows. The rows are addressed in sequence so that impedance means for defining the value of the second current may be shared between rows, thus reducing the number of components required to define the value of second current and improving the reliability of the arrangement.

4 Claims, 2 Drawing Figures

MAGNETIC DATA STORAGE ARRANGEMENT HAVING SEQUENTIAL ADDRESSING OF ROWS

This invention relates to magnetic data storage arrangements.

The invention relates particularly to such arrangements of the kind including a plurality of current operated bistable magnetic elements arranged in rows and columns, write means for operating a desired selection of the elements of any selected column to a second stable state whilst the other elements remain in their first stable state, thereby to store a data word in any selected column, and read means for sensing the stable states of all the elements in any selected column, thereby to read out the stored data word in that selected column.

According to the present invention, in a magnetic data storage arrangement of the kind specified said write means comprises first means for applying a first current of predetermined value simultaneously to all the elements of any selected column, and second means for applying a second current of predetermined value simultaneously to all the elements of each of any desired selection of rows in turn while the said first current is applied to the selected column, the arrangement being such that an element is operated into its said second stable state only when a said first current and a said second current are applied to it simultaneously, and said second means including circuit means for defining said predetermined value of the second current, at least two rows sharing the same current value defining circuit.

One advantage of an arrangement in accordance with the invention is that the current value defining circuit means of the second means, which in practice utilises components of relatively low reliability, incorporates a smaller number of components than in similar known storage arrangements, with a corresponding improvement in reliability. In such known arrangements each row is addressed simultaneously so that a separate current value defining circuit for each row is required.

In one particular arrangement according to the present invention, a single current value defining circuit is provided for all the rows and this gives the highest reliability. In an alternative arrangement one half of the rows share a first current value defining circuit and the other half share a second current value defining circuit giving lower reliability but faster writing speed.

Figure 1:
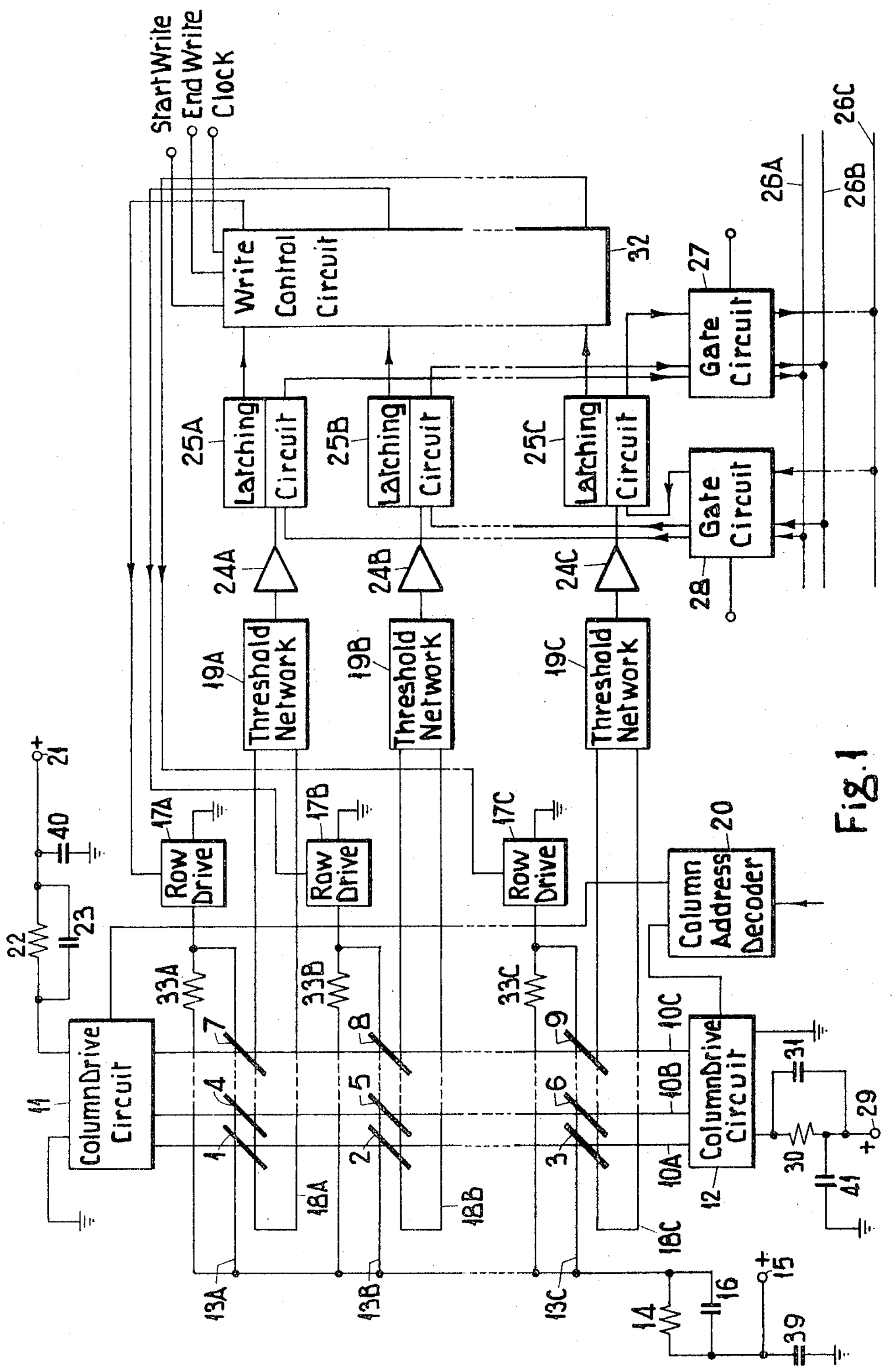
Figure 2:
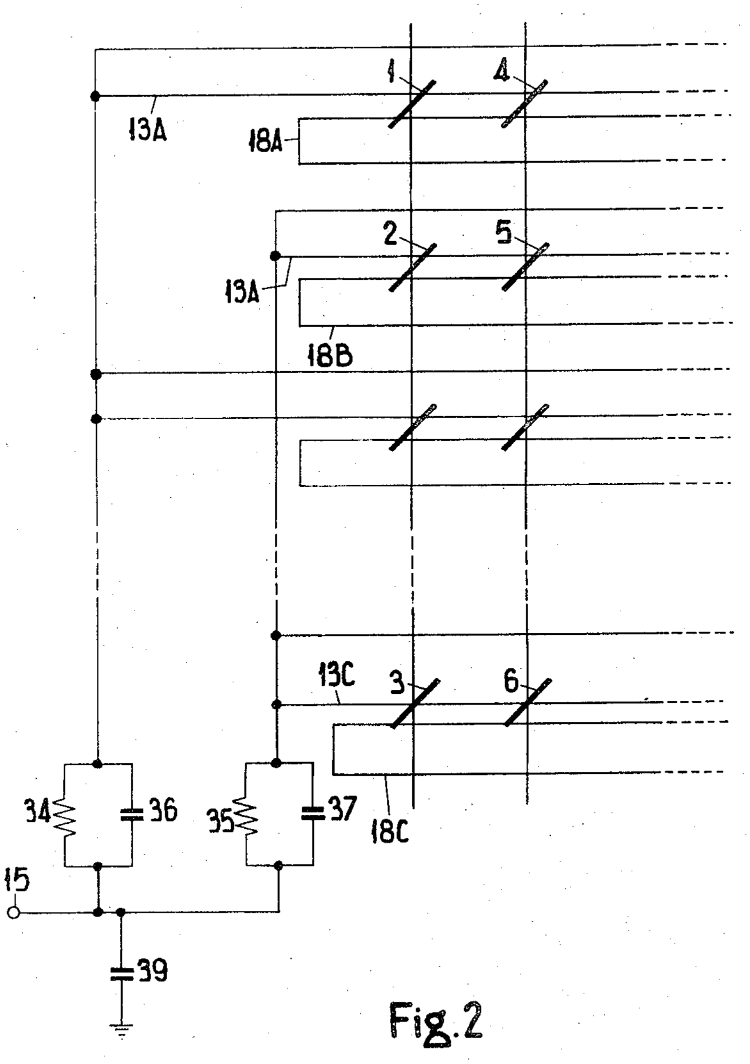

One arrangement in accordance with the invention will now be described by way of example with reference to the accompanying drawings in which:

FIG. 1 is a circuit diagram, for the most part of block schematic form, of a data store arrangement constituting a data scratch pad of a digital computer; and FIG. 2 illustrates a modification of the arrangement shown in FIG. 1.

Referring to FIG. 1, the data store arrangement is arranged to provide storage of thirty-two binary data words each of twenty-four bits. To this end, the arrangement incorporates 768 toroidal magnetic cores arranged in a rectangular matrix of twenty-four rows and thirty-two columns. The core members are fabricated of a ferromagnetic material having a generally rectangular hysteresis characteristic so as to have two sharply defined, stable magnetic states. In FIG. 1 only nine cores 1 to 9 are shown, cores 1, 2 and 3 constituting the first, second and twenty-fourth cores of the first column, cores 4, 5 and 6 constituting the corresponding cores of the second column, and cores 7, 8 and 9 constituting the corresponding cores of the thirty-second column. Thus, cores 1, 4 and 7 constitute the first, second and thirty-second cores of the first row, and cores 2, 5 and 8 and 3, 6 and 9 constitute the corresponding cores of the second and twenty-fourth rows respectively.

Hereafter, corresponding components of the arrangement associated with different rows or columns will be given the same reference number with a suffix A representing the first row or column, a suffix B representing the second row or column, or a suffix C representing the twenty-fourth row or thirty-second column, as appropriate.

All the cores in each column are inductively coupled with a respective column drive line 10, each line 10 being connected between two column drive circuits 11 and 12 whose function is described later.

All the cores in each row are inductively coupled with a respective row write line 13, each write line 13 being shunted by a resistor 33. One end of every write line 13 is connected via a common resistor 14 to a positive terminal 15, the resistor being shunted by a capacitor 16. The other ends of the write lines 13 are connected to respective row drive circuits 17A etc. whose function is described later.

In addition, all the cores in each row are inductively coupled with a respective sense line 18 which is connected with a respective threshold network 19.

As is further explained below, in use of the arrangement, a twenty-four bit word may be stored in any selected column of the core matrix by operating selected ones of the cores in that column into their second stable magnetic state while maintaining the other cores in that row in their first stable state.

To read out a word thus stored a signal defining the relevant column is fed from the main part of the computer (not shown) to a column address decoder circuit 20. Under control of the decoder 20, the column drive circuit 12 is caused to connect to earth momentarily the adjacent end of the relevant one of the column drive lines 10, and the drive circuit 11 is simultaneously caused to connect the other end of the relevant drive line 10 to a positive terminal 21 via a resistor 22 which is shunted by a capacitor 23. The resulting current pulse in the relevant drive wire 10 (hereafter called a read pulse) is of such a sense and magnitude, as defined by the resistor 22, as to operate into their first stable state all the cores in the relevant column 10 which were in their second stable state prior to application of the pulse. The resulting flux changes induce voltages in the corresponding ones of the sense lines 18. These voltages cause the associated threshold networks 19 to produce outputs which are respectively applied to amplifiers 24A etc. whose outputs are used to operate bistable electronic latching circuits 25A etc. from a first to a second stable state. The read pulse in the drive line 10 produces only a relatively small flux change in the cores which were in their first stable state prior to the application of the pulse. The resulting induced voltages in the corresponding sense lines 18 are consequently insufficient to exceed the threshold voltages of the associated threshold networks 19, and the associated latching circuits 25 consequently remain in their first stable state. Thus the latching circuits 25 are operated into conditions representing the word stored in the relevant column of the core matrix prior to application of the read pulse.

Any word stored in the latching circuits 25 may be read via a gate circuit 27 onto the main data highway of the computer represented by lines 26A etc., the circuit 27 being controlled by the computer.

Similarly, any word on the data highway 26 may be written into the latching circuits 25 by way of a gate circuit 28 controlled by the computer.

Any word stored in the latching circuits 25 may be written into any selected column of the core matrix. To effect such an operation the computer supplies a signal to the column address decoder 20 defining an available column, i.e. a column in which all the cores are in their first stable state. Under control of the decoder 20 the column drive circuit 11 is caused to connect for a short period the adjacent end of the relevant one of the column drive lines 10 to earth, and the drive circuit 12 is simultaneously caused to connect the other end of the relevant drive line 10 to a positive terminal 29 via a resistor 30 shunted by a capacitor 31. The resulting current pulse in the relevant drive line 10 (hereafter called a column write pulse) is of such a sense as to drive the associated cores towards their second stable state, but its magnitude, defined by resistor 30, is half that of a read pulse, and is thus insufficient to alter the stable magnetic state of any core.

During application of the column write pulse, the row drive circuits 17 corresponding to those of the latching circuits 25 which are in their second stable state are caused to connect to earth in sequence the adjacent ends of their associated write lines 13, thereby to apply in sequence respective current pulses (hereafter called row write pulses) to their associated write lines 13. For this purpose the row drive circuits 17 are controlled by a write control logic circuit 32 which senses the states of the latching circuits 25, the logic circuit being supplied with clock pulses for timing the sequential operation of the drive circuits 17, and also with a signal to start the writing operation. A signal to indicate completion of the writing operation is also provided by the write control circuit.

The row write pulses have a magnitude, defined by the resistor 14, approximately equal to the column write pulse being applied to the relevant line 10, and are of such a sense as to magnetise the associated cores in the same sense as the applied column write pulse. Thus, only those cores in the relevant column to which row write pulses are applied are operated into their second stable state, all the other cores in the matrix remaining in their existing stable state.

It will be appreciated that the current values of the read and write pulses must be accurately defined, and that the resistors 14, 22 and 30 must therefore be of accurate value. In addition, these resistors are of relatively high power rating, and as is well known, low tolerance power resistors have relatively high failure rates. However, in the arrangement described only a single resistor 14 is required to define the row write pulse current values and the reliability of the arrangement is accordingly much higher than similar arrangements wherein the rows are addressed simultaneously and a separate current defining resistor for each row is required.

The sequential application of the row write pulses means, of course, that the writing speed of the arrangement is relatively slow. This is because the capacitor

16, whose purpose is to reduce the rise time of the row write pulses, must be discharged at the end of each row write pulse before the next row is addressed.

Referring now to FIG. 2, in a modification of the arrangement shown in FIG. 1 the odd and even numbered row drive lines are respectively connected to the positive terminal 15 via separate resistors 34 and 35, having respective capacitors 36 and 37 connected in parallel with them. With this arrangement, the capacitor/resistor combinations 34, 36 and 35, 37 are used in turn as the rows are addressed in sequence, and each of the capacitors 36 and 37 is arranged to discharge whilst the other capacitor/resistor combination 35, 37 or 34, 36 is in use. Thus, the writing speed can be made approximately twice that of the arrangement shown in FIG. 1.

To prevent corruption of stored data in the arrangements described on failure of the power supplies to the arrangements, provision is made for:

A. maintaining the voltages at terminals 15, 21 and 29 from which the core drive currents are derived for at least one read/write cycle after supply failure.

B. maintaining the current supplies to the logic circuits controlling the read and write pulses until after the voltages at terminals 15, 21 and 29 have been disconnected; and C. when the supply is restored, reconnecting the voltage supply to the logic circuits before the supply to the terminals 15, 21 and 29 is reconnected.

To maintain the voltages at terminals 15, 21 and 29 as required by condition (A) above, a respective battery of storage capacitors is connected between each of the terminals 15, 21 and 29 and earth, these batteries of capacitors being represented by respective single capacitors 39, 40 and 41 in the drawings. Similar batteries of storage capacitors (not shown) are provided to maintain the supply to the logic circuits as required by condition (B) above. The required disconnection and reconnection of the supplies is effected by switch means (not shown) controlled by the computer.

The sequential application of the row write pulses in an arrangement in accordance with the invention allows the capacitor battery 39 to contain a smaller number of capacitors than in an arrangement where the rows are addressed simultaneously. The reason for this is as follows:

When stored energy is extracted from a capacitance, the voltage across it decreases. Hence, in order for the voltage across a capacitance to remain substantially constant while a given quantity of energy is extracted from it, the total stored energy must be large compared with the extracted energy. Consequently, the magnitudes of the storage capacitances required to maintain the core drive and logic circuit voltages on power failure are so large that the use of electrolytic capacitors for these capacitances is a practical necessity. An electrolytic capacitor has the property that its effective capacitance is reduced by an amount dependent on the rate at which charge is extracted from it. As a result, it is necessary for each storage capacitance to comprise a battery of capacitors connected in parallel so that each capacitor experiences a relatively low discharge rate, the numbers of capacitors in a battery being dependent on the maximum discharge rate which that battery of capacitors may experience at any time in operation. In the arrangements described above, the maximum discharge rate for the capacitor battery 39 is clearly the row write drive current required by a single row. Thus, the capacitor battery 39 may comprise a smaller number of capacitors than in an arrangement in which the rows are addressed simultaneously so that the maximum discharge rate is the sum of all the required row currents. The overall failure rate of the capacitor battery 39 is thus improved.

It will be appreciated that the capacitor battery 41 for the column write drive current and the capacitor batteries for the logic circuits are required to maintain the voltages at the associated terminals for a relatively long period due to the sequential application of the row write pulses. However, since the maximum discharge rate of these batteries is the same for simultaneous and sequential write operations, this can be achieved by increasing the value of the capacitors in the batteries without increasing their number. Thus, the overall failure rate of the capacitor batteries provided to prevent store corruption on power failure can be improved by the sequential application of row write pulses, as in an arrangement according to the present invention.

It will be understood that while the arrangements described by way of example both utilise a two-dimensional magnetic element matrix, the invention is equally applicable to arrangements employing a three-dimensional magnetic element matrix.

I claim:

1. A magnetic data storage arrangement comprising: a plurality of current operated bistable magnetic elements arranged in rows and columns; a set of column conductors each of which is inductively coupled with a respective column of said magnetic elements; a set of row conductors each of which is inductively coupled with a respective row of said magnetic elements; write means comprising first drive means for applying a first current of predetermined value to any selected column conductor, and second drive means for applying a second current of predetermined value to each in turn of any desired selection of row conductors whereby simultaneous first and second said currents can be applied in turn to a desired selection of elements in a selected column, thereby to operate said desired selection of elements into their second stable magnetic state and store a data word in said selected column; impedance means incorporated in said second drive means for defining the value of said second current for each row conductor, at least two row conductors sharing the same current defining impedance means; and read means for sensing the stable states of all the elements in any selected column, thereby to read out the stored data word in that selected column.

2. An arrangement according to claim 1 wherein all the row conductors share a common current defining impedance means.

3. An arrangement according to claim 1 wherein one half of the row conductors share a first current defining impedance means and the other half of the row conductors share a second current defining impedance means.

4. An arrangement according to claim 1 wherein each said current defining impedance means is associated with a respective battery of storage capacitors for temporarily maintaining said second drive current in the associated row conductors in the event of a failure of the electric power supply to the arrangement.

* * * * *